(12) United States Patent
Naito et al.

(10) Patent No.: US 8,778,451 B2
(45) Date of Patent: Jul. 15, 2014

(54) METHOD OF MANUFACTURING OPTICAL WAVEGUIDE

(75) Inventors: Ryusuke Naito, Ibaraki (JP); Akiko Nagafuji, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/173,391

(22) Filed: Jun. 30, 2011

(65) Prior Publication Data

US 2012/0003393 A1 Jan. 5, 2012

(30) Foreign Application Priority Data

Jul. 5, 2010 (JP) .................................. 2010-153343

(51) Int. Cl.
*B05D 5/06* (2006.01)

(52) U.S. Cl.
USPC ........................................ 427/163.2; 427/133

(58) Field of Classification Search
USPC .............................................. 427/133, 163.2
See application file for complete search history.

(56) References Cited

U.S. PATENT DOCUMENTS

| | | | |
|---|---|---|---|
| 3,957,411 A * | 5/1976 | Schiesser | 425/215 |
| 2003/0117614 A1 | 6/2003 | Kikuchi et al. | |
| 2005/0212182 A1 | 9/2005 | Yokoyama et al. | |
| 2006/0091571 A1 | 5/2006 | Akutsu et al. | |
| 2007/0014523 A1* | 1/2007 | Ohtsu et al. | 385/89 |
| 2007/0064188 A1 | 3/2007 | Okamoto | |
| 2008/0013903 A1 | 1/2008 | Fujii et al. | |
| 2008/0193094 A1* | 8/2008 | Enami et al. | 385/130 |
| 2008/0198144 A1 | 8/2008 | Shimizu et al. | |
| 2008/0277809 A1* | 11/2008 | Shimizu | 264/1.24 |
| 2009/0196559 A1 | 8/2009 | Makino et al. | |
| 2009/0261488 A1 | 10/2009 | Shimizu | |
| 2009/0286187 A1 | 11/2009 | Hodono et al. | |
| 2012/0251038 A1 | 10/2012 | Nagafuji et al. | |

FOREIGN PATENT DOCUMENTS

| | | |
|---|---|---|
| CN | 101303436 A | 11/2008 |
| CN | 101561532 A | 10/2009 |
| JP | 51-42760 A | 4/1976 |
| JP | S60-141512 A | 7/1985 |

(Continued)

OTHER PUBLICATIONS

U.S. Office Action dated Sep. 14, 2012, issued in copending related U.S. Appl. No. 13/173,887.

(Continued)

*Primary Examiner* — Elizabeth Burkhart
(74) *Attorney, Agent, or Firm* — Westerman, Hattori, Daniels & Adrian, LLP

(57) ABSTRACT

A method of manufacturing an optical waveguide is provided in which a mold that prevents fins or burrs from being formed is used for the formation of an over cladding layer in the optical waveguide. The mold for the formation of the over cladding layer is produced from a light-transmissive resin by molding using a mold member including a protruding portion identical in shape with the over cladding layer and a ridge portion provided around the protruding portion. For the formation of the over cladding layer, the cavity is filled with a photosensitive resin for the formation of the over cladding layer, and the photosensitive resin is cured by being exposed to light through the mold while cores formed on a surface of an under cladding layer are immersed in the photosensitive resin and part of the photosensitive resin spilling out of the cavity is collected in the groove.

4 Claims, 3 Drawing Sheets

(56) References Cited

FOREIGN PATENT DOCUMENTS

| JP | 61-138903 | A | 6/1986 |
|---|---|---|---|
| JP | 5-228946 | A | 9/1993 |
| JP | 2002-120286 | A | 4/2002 |
| JP | 2002-321227 | A | 11/2002 |
| JP | 2004-50493 | A | 2/2004 |
| JP | 2004-117585 | A | 4/2004 |
| JP | 2004-184480 | A | 7/2004 |
| JP | 2005-017816 | A | 1/2005 |
| JP | 2005-290106 | A | 10/2005 |
| JP | 2008-203431 | A | 9/2008 |
| JP | 2008-281654 | A | 11/2008 |
| JP | 2009-258417 | A | 11/2009 |
| JP | 2009-276724 | A | 11/2009 |
| WO | 2008/062836 | A1 | 5/2008 |

OTHER PUBLICATIONS

U.S. Office Action dated Sep. 25, 2012, issued in copending related U.S. Appl. No. 13/236,781.
U.S. Office Action dated Dec. 20, 2012, issued in related U.S. Appl. No. 13/113,220.
Notice of Allowance and Fee(s) Due dated Mar. 4, 2013, issued in related U.S. Appl. No. 13/173,887.
Japanese Office Action dated Jun. 11, 2013, issued in corresponding Japanese Patent Application No. 2010-153343, w/English Translation.
Japanese Office Action dated Jun. 11, 2013, issued in related Japanese Patent Application No. 2010-153343, w/English Translation.
Japanese Office Action dated Jun. 25, 2013, issued in corresponding application No. 2010-126714, with English Translation.
U.S. Non-Final Office Action dated Sep. 10, 2013, issued in related U.S. Appl. No. 13/113,220.
U.S. Final Office Action dated Apr. 3, 2013, issued in related U.S. Appl. No. 13/236,781.
U.S. Non-Final Office Action dated Aug. 19, 2013, issued in related U.S. Appl. No. 13/173,887.
U.S. Final Office Action dated May 31, 2013, issued in related U.S. Appl. No. 13/113,220.
U.S. Office Action dated Dec. 5, 2013, issued in related U.S. Appl. No. 13/173,887.
Chinese Office Action dated Dec. 4, 2013, issued in related Chinese Patent Application No. 201110186064.1 with English translation (15 pages).
Chinese Office Action dated Dec. 6, 2013, issued in corresponding Chinese Patent Application No. 201110186062.2 with English translation (14 pages).
Chinese Office Action dated Jan. 23, 2014, issued in Chinese application No. 201110144091.2, w/ English translation (15 pages).
Chinese Search Report dated Mar. 5, 2014, issued in Chinese application No. 201110303868.5, w/ English translation (5 pages).

* cited by examiner

METHOD OF MANUFACTURING OPTICAL WAVEGUIDE

BACKGROUND OF THE INVENTION

1. Field of the Invention

The present invention relates to a method of manufacturing an optical waveguide for widespread use in the fields of optical communications, optical information processing, position sensors, and other general optics technology.

2. Description of the Related Art

In general, an optical waveguide is configured in such a manner that cores serving as a passageway for light are formed in a predetermined pattern on a surface of an under cladding layer, and that an over cladding layer is formed so as to cover the cores. In particular, for the formation of the over cladding layer of a desired shape, e.g. the over cladding layer having an end portion in the form of a lens portion, a mold including a cavity having a mold surface of a shape complementary to the desired shape of the over cladding layer is used to form the over cladding layer (as disclosed, for example, in Japanese Published Patent Application No. 2008-281654).

The assignee of the present application has proposed a mold made of a light-transmissive resin which is excellent in dimensional accuracy as a mold for the formation of the over cladding layer, and has already applied for a patent (Japanese Patent Application No. 2010-126714). This mold is produced in a manner to be described below. First, a mold member of a shape identical with the shape of the over cladding layer is prepared, and is placed in a mold production container. Then, the container is filled with a light-transmissive resin, and the light-transmissive resin is cured. The cured light-transmissive resin is taken out of the container, and the mold member is removed. This provides a mold made of a light-transmissive resin in which a hollow resulting from the removal of the mold member serves as a cavity for the formation of the over cladding layer.

An optical waveguide is produced using the above-mentioned mold in a manner to be described below. First, the cavity of the mold is filled with a photosensitive resin for the formation of the over cladding layer. Then, cores formed on a surface of an under cladding layer are immersed in the photosensitive resin, and the under cladding layer is pressed against the mold. Next, the photosensitive resin is exposed to light through the mold, whereby the photosensitive resin is cured and formed into the over cladding layer. Thereafter, the mold is removed. This provides an optical waveguide including the under cladding layer, the cores, and the over cladding layer.

In the step of forming the over cladding layer in the optical waveguide, the photosensitive resin for the formation of the over cladding layer is in general charged in rather greater amounts into the cavity of the mold to prevent air from becoming trapped in the photosensitive resin when the under cladding layer with the cores provided thereon is pressed against the mold. Thus, when the under cladding layer is pressed against the mold, an excess amount of the photosensitive resin tends to spill out of the cavity, so that the spilling photosensitive resin is interposed between the mold and the under cladding layer around the cavity. The photosensitive resin interposed between the mold and the under cladding layer tends to be cured as it is when subjected to the exposure process, thereby forming fins or burrs. The fins or burrs are cut off after the mold is removed. However, the fins or burrs formed on the lens portion of the over cladding layer cannot be cut off along a lens-shaped curved surface of the over cladding layer to result in a tendency toward insufficient lens performance.

Also, the presence of the photosensitive resin between the mold and the under cladding layer as mentioned above causes the mold to be shifted a distance corresponding to the thickness of the photosensitive resin from its proper vertical position. This produces the over cladding layer with a height greater than its design value to give rise to an improper positional relationship between the cores and the over cladding layer. As a result, a light beam emitted from a distal end of each of the cores is not appropriately narrowed down by the lens portion at an end of the over cladding layer, but exits the lens portion while being widened. This decreases the intensity of received light (or light propagation characteristics) on a light-receiving side. Additionally, the fins or burrs have thick portions and thin portions, which cause variations in the characteristics of the product (the optical waveguide), impairing the uniformity of the characteristics. The formation of the over cladding layer by the use of the mold still has room for improvement in this regard.

SUMMARY OF THE INVENTION

A method of manufacturing an optical waveguide is provided in which a mold that prevents fins or burrs from being formed is used for the formation of an over cladding layer in the optical waveguide.

The method comprises the steps of: forming a core having a pattern on a surface of an under cladding layer; and forming an over cladding layer so as to cover the core by using a mold including a cavity having a mold surface complementary in shape to the over cladding layer. The step of forming the over cladding layer includes the substeps of filling the cavity of the mold with a photosensitive resin for the formation of the over cladding layer, and exposing part of the photosensitive resin lying in the cavity to light through the mold, while the core is immersed in the photosensitive resin and part of the photosensitive resin spilling out of the cavity is collected in a groove formed in the mold, to cure the part of the photosensitive resin lying in the cavity, thereby forming the over cladding layer. The mold is made of a light-transmissive resin. The mold is produced by placing in a mold production container a mold member including a protruding portion identical in shape with the over cladding layer and a ridge portion provided around the protruding portion, filling the container with a light-transmissive resin, curing the light-transmissive resin, then taking the cured light-transmissive resin out of the container, and removing the mold member from the cured light-transmissive resin, whereby a hollow resulting from the removal of the protruding portion serves as the cavity for the formation of the over cladding layer, and a hollow resulting from the removal of the ridge portion serves as the groove configured to collect the part of the photosensitive resin spilling out of the cavity.

To produce a mold for the formation of an over cladding layer which prevents fins or burrs from being formed, the configuration of the mold has been studied. A groove is formed around a cavity for the formation of the over cladding layer in a mold to collect part of a photosensitive resin for the formation of the over cladding layer spilling out of the cavity which causes fins or burrs in the groove, thereby forming the over cladding layer in that state. Specifically, a ridge portion for the formation of the groove is formed on the mold member, whereby a mold having the groove is produced. Then, the formation of the over cladding layer by the use of the mold achieves the production of an optical waveguide free from fins or burrs.

In the method of manufacturing an optical waveguide according to the present invention, the mold for the formation of the over cladding layer is produced from a light-transmissive resin by molding using a mold member including a protruding portion identical in shape with the over cladding layer and a ridge portion formed around the protruding portion. This provides the mold including a groove provided around a cavity for the formation of the over cladding layer and configured to collect therein part of a photosensitive resin for the formation of the over cladding layer spilling out of the cavity. In the step of forming the over cladding layer, the use of the mold allows the groove to collect therein the photosensitive resin which causes fins or burrs, thereby achieving the production of an optical waveguide free from fins or burrs. This eliminates the need for the step of cutting off the fins or burrs to thereby improve the productivity of optical waveguides.

Preferably, a mold surface part of the cavity of the mold corresponding to a portion of the over cladding layer covering a distal end of the core is configured in the form of a lens-shaped curved surface. This provides an optical waveguide including an over cladding layer portion covering the distal end of the core and configured in the form of a lens portion. In this optical waveguide, a light beam emitted from the distal end of the core is restrained from diverging by refraction through the lens portion of the over cladding layer. Also, a light beam coming through the surface of the lens portion of the over cladding layer is narrowed down and converged by refraction through the lens portion when entering the distal end of the core. That is, the optical waveguide thus provided is excellent in light propagation characteristics.

Preferably, the light-transmissive resin serving as a material for the formation of the mold contains a silicone resin. This provides the mold with higher dimensional accuracy to accordingly provide an optical waveguide more excellent in light propagation characteristics.

DETAILED DESCRIPTION OF THE INVENTION

A preferred embodiment according to the present invention will now be described in detail with reference to the drawings.

Figure 2A:
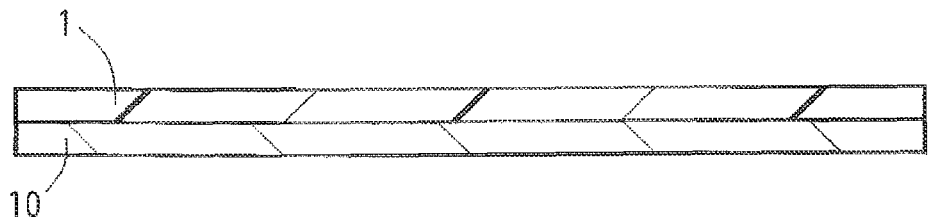
FIGS. 2A to 2D are views schematically illustrating a method of manufacturing an optical waveguide by using the mold.
Figure 2B:
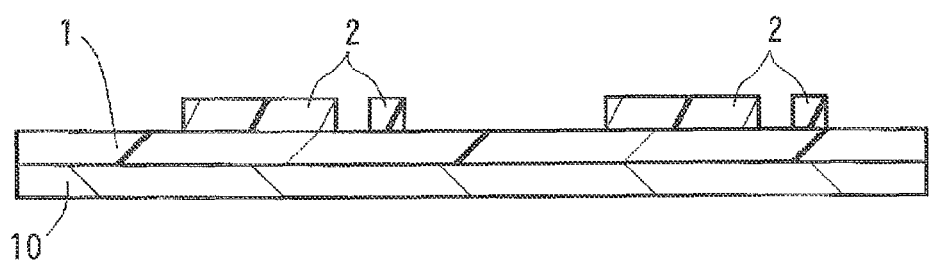
Figure 2C:
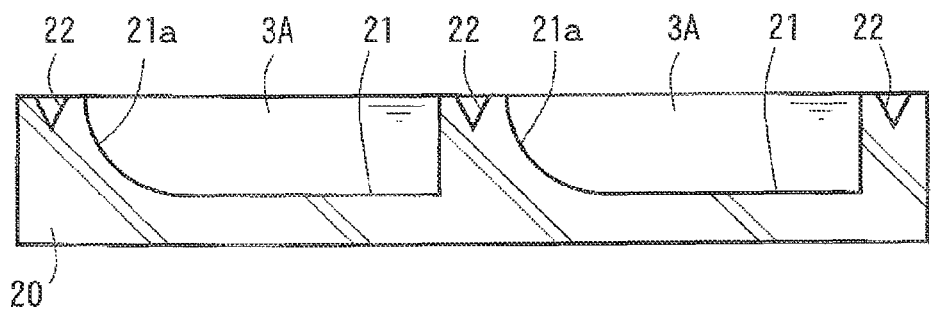
Figure 2D:
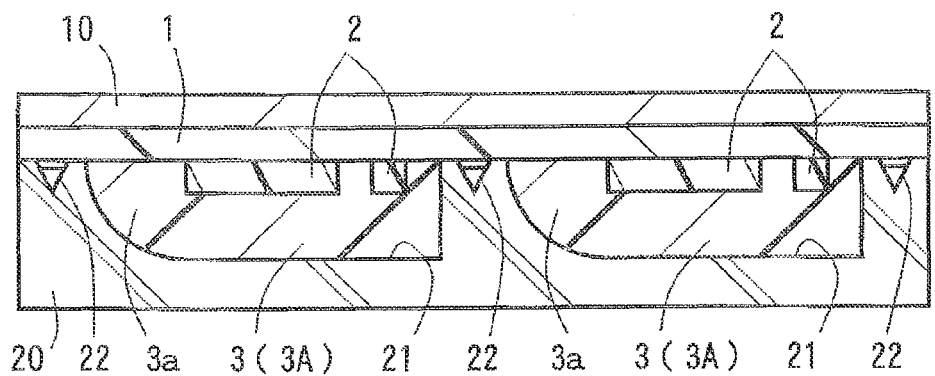

In a method of manufacturing an optical waveguide according to the preferred embodiment, a mold 20 integrally produced from a light-transmissive resin by molding and including a groove 22 formed around each cavity 21 for the formation of an over cladding layer 3 is used for the formation of the over cladding layer 3 (with reference to FIG. 2D). The use of the mold 20 for the formation of the over cladding layer 3 prevents an excess amount of a photosensitive resin 3A spilling out of each cavity 21 from being interposed between the mold 20 and an under cladding layer 1 but allows the groove 22 to receive and collect the excess amount of the photosensitive resin 3A therein when the under cladding layer 1 with cores 2 provided thereon is pressed against the mold 20, thereby providing an optical waveguide free from fins or burrs.

In this preferred embodiment, the mold 20 (with reference to FIG. 2C) includes two cavities 21 each having one end portion (a left-hand end portion as seen in FIG. 2C) configured in the form of a lens-shaped curved surface 21a. The grooves 22 have a V-shaped cross-sectional configuration.

A method of manufacturing the mold 20 will be described in detail.

Figure 1A:
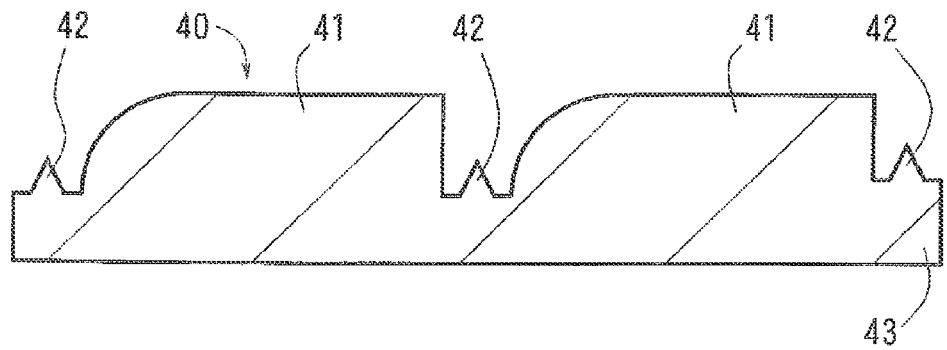
FIGS. 1A to 1C are views schematically illustrating a method of manufacturing a mold for the formation of an over cladding layer, which is used in a method of manufacturing an optical waveguide according to a preferred embodiment.

First, as shown in FIG. 1A, a mold member 40 is produced so that the mold member 40 protrudes upwardly from an upper surface of the base member 43. The mold member 40 includes protruding portions 41 each identical in shape with the over cladding layer 3 (with reference to FIG. 3), and ridge portions 42 formed around the protruding portions 41. The production of the mold member 40 is achieved, for example, by cutting a plate-like member with a cutting blade. Examples of a material for the formation of the mold member 40 include aluminum, stainless steel, and iron. Of these, aluminum is preferred from the viewpoint of machinability. In this preferred embodiment, the ridge portions 42 have a triangular cross-sectional configuration.

Figure 1B:
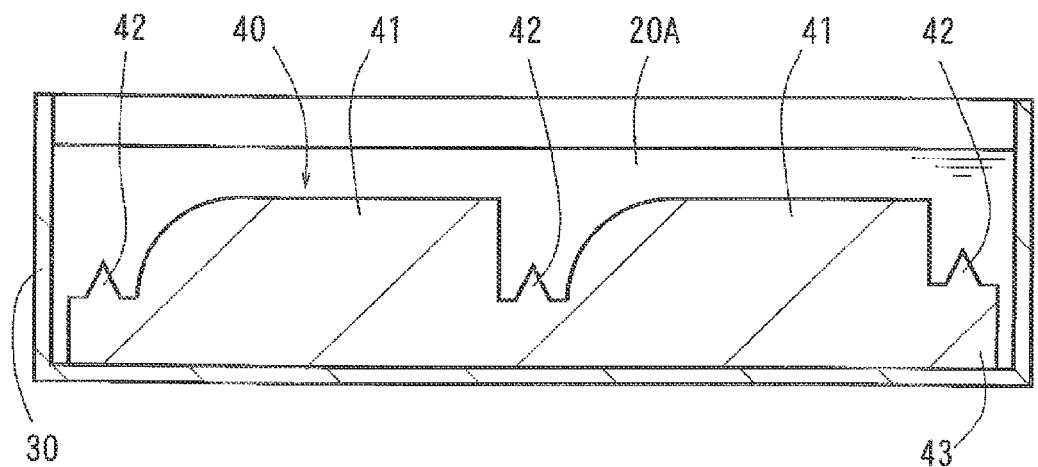

Then, as shown in FIG. 1B, the structure including the mold member 40 and the base member 43 is placed in a mold production container 30. At this time, the structure is preferably placed in the bottom of the container 30, with the mold member 40 located on an upper side and the base member 43 located on a lower side, as shown in FIG. 1B. It is also preferable to apply a mold release agent to an inner surface of the container 30 and to surfaces of the mold member 40 and the base member 43.

Next, as shown in FIG. 1B, the container 30 is filled with a liquid light-transmissive resin 20A so that the mold member 40 is entirely immersed in the light-transmissive resin 20A. Examples of the light-transmissive resin 20A include siloxane resins, acrylic resins, and epoxy resins. These resins are used either singly or in combination. In particular, the light-transmissive resin 20A preferably contains a silicone resin from the viewpoint of providing the mold 20 with high dimensional accuracy.

Then, the light-transmissive resin 20A is cured. For this curing, an ordinary temperature atmosphere, a heated atmosphere or a combination of the ordinary temperature atmosphere and the heated atmosphere is employed depending on the type of light-transmissive resin 20A.

Figure 1C:
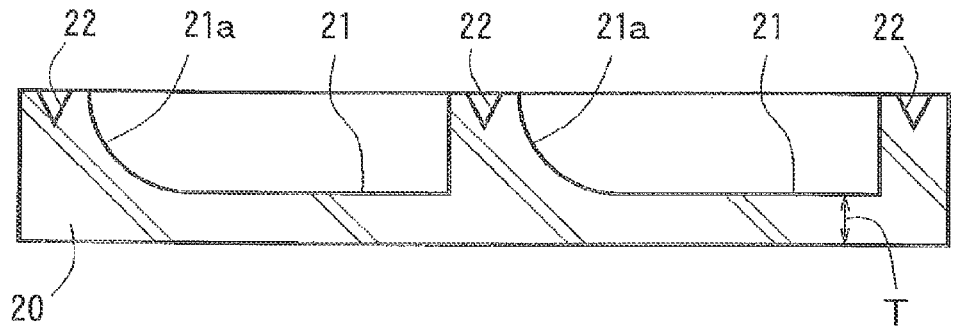

Thereafter, the cured light-transmissive resin 20A is taken together with the mold member 40 and the base member 43 out of the container 30. Then, the structure including the mold member 40 and the base member 43 is removed from the cured light-transmissive resin 20A. Hollows resulting from the removal of the protruding portions 41 of the mold member 40 serve as the respective cavities 21 (with reference to FIG. 1C) each having a mold surface complementary in shape to the over cladding layer 3 (with reference to FIG. 2D). Hollows resulting from the removal of the ridge portions 42 of the mold member 40 serve as the grooves 22 (with reference to FIG. 1C) around the cavities 21. Then, unnecessary portions of the cured light-transmissive resin 20A which have been present laterally around the base member 43 are cut off. In this manner, the mold 20 made of a light-transmissive resin is provided as shown in FIG. 1C (shown in an orientation vertically inverted from that shown in FIG. 1B). The mold 20 preferably has a thickness T in the range of 0.5 to 5.0 mm as measured between the bottom surface of each of the cavities 21 and the lower surface of the mold 20 as seen in FIG. 1C from the viewpoints of light transmission properties, strength, and the like. In general, the size of the grooves 22 is defined so that the grooves 22 are not filled up with the photosensitive resin 3A (with reference to FIG. 2D) spilling out of the cavities 21. For example, the grooves 22 have a width in the range of 1 to 10 mm, and a depth in the range of 0.1 to 1.0 mm.

Next, a method of manufacturing an optical waveguide will be described in detail.

First, a base 10 of a flat shape (with reference to FIG. 2A) for use in the formation of the under cladding layer 1 is prepared. Examples of a material for the formation of the base 10 include metal, resin, glass, quartz, and silicon. In particular, a stainless steel (SUS) substrate is preferably used as the base 10. This is because the stainless steel substrate is excellent in resistance to thermal expansion and contraction, so that various dimensions thereof are maintained substantially at their design values in the course of the manufacture of the optical waveguide. The thickness of the base 10 is, for example, in the range of 20 μm (in film form) to 5 mm (in plate form).

Then, as shown in FIG. 2A, the under cladding layer 1 is formed on a surface of the base 10. Examples of a material for the formation of the under cladding layer 1 include thermosetting resins and photosensitive resins. When a thermosetting resin is used, a varnish prepared by dissolving the thermosetting resin in a solvent is applied to the surface of the base 10 and is then heated to thereby form the under cladding layer 1. When a photosensitive resin is used, on the other hand, a varnish prepared by dissolving the photosensitive resin in a solvent is applied to the surface of the base 10 and is then exposed to irradiation light such as ultraviolet light to thereby form the under cladding layer 1. The thickness of the under cladding layer 1 is, for example, in the range of 5 to 50 μm.

Next, as shown in FIG. 2B, the cores 2 having a predetermined pattern are formed on a surface of the under cladding layer 1 by a photolithographic method. Preferably, a photosensitive resin excellent in patterning characteristics is used as a material for the formation of the cores 2. Examples of the photosensitive resin include UV-curable acrylic resins, UV-curable epoxy resins, UV-curable siloxane resins, UV-curable norbornene resins, and UV-curable polyimide resins. These resins are used either singly or in combination. Examples of the sectional configuration of the cores 2 include a trapezoid and a rectangle having excellent patterning characteristics. The width of the cores 2 is, for example, in the range of 10 to 500 μm. The thickness (height) of the cores 2 is, for example, in the range of 25 to 100 μm.

The material for the formation of the cores 2 used herein has a refractive index higher than that of the material for the formation of the under cladding layer 1 described above and the over cladding layer 3 to be described below (with reference to FIG. 3), and is highly transparent to the wavelength of light to be propagated. The refractive index is adjusted, i.e. increased or decreased as appropriate, by changing at least one of the type and content of an organic group introduced into the resins that are the materials for the formation of the under cladding layer 1, the cores 2 and the over cladding layer 3. As an example, the refractive index is increased by introducing a cyclic aromatic group (e.g., a phenyl group) into a resin molecule or by increasing the content of the aromatic group in the resin molecule. On the other hand, the refractive index is decreased by introducing a straight-chain or cyclic aliphatic group (e.g., a methyl group and a norbornene group) into the resin molecule or by increasing the content of the aliphatic group in the resin molecule.

Then, as shown in FIG. 2C, the mold 20 for the formation of the over cladding layer, which is produced in the above-mentioned step, is placed on a molding stage (not shown), with the cavities 21 and the grooves 22 positioned upwards. The cavities 21 are filled with the liquid photosensitive resin 3A which is a material for the formation of the over cladding layer 3 (with reference to FIG. 2D).

Then, as shown in FIG. 2D, the cores 2 formed in the predetermined pattern on the surface of the under cladding layer 1 are immersed in the photosensitive resin 3A serving as the material for the formation of the over cladding layer 3. In this state, the cores 2 are positioned relative to the cavities 21 of the mold 20, and the under cladding layer 1 is pressed against the mold 20. The pressing load at this time is, for example, in the range of 49 to 980 N. At this time, an excess amount of the photosensitive resin 3A spills out of the cavities 21 into the grooves 22, and is collected in the grooves 22. Parts of the mold 20 where the cavities 21 are formed, which are made of resin, are resistant to pressure. This allows the under cladding layer 1 to be pressed against the mold 20 into intimate contact with the mold 20, and the photosensitive resin 3A is absent at the contact between the under cladding layer 1 and the mold 20.

Next, irradiation light such as ultraviolet light is directed through the mold 20 onto the photosensitive resin 3A, whereby the photosensitive resin 3A is exposed to the irradiation light. This exposure process cures parts of the photosensitive resin 3A lying within the cavities 21 to form over cladding layers 3 each having one end portion configured as a lens portion 3a and adhering to the under cladding layer 1 and the cores 2. The thickness of the over cladding layers 3 (as measured from the surface of the under cladding layer 1) is, for example, in the range of 25 to 1500 μm. In general, parts of the photosensitive resin 3A lying within the grooves 22, which do not fill up the grooves 22, are cured by the exposure process but do not adhere to the under cladding layer 1.

Figure 3:
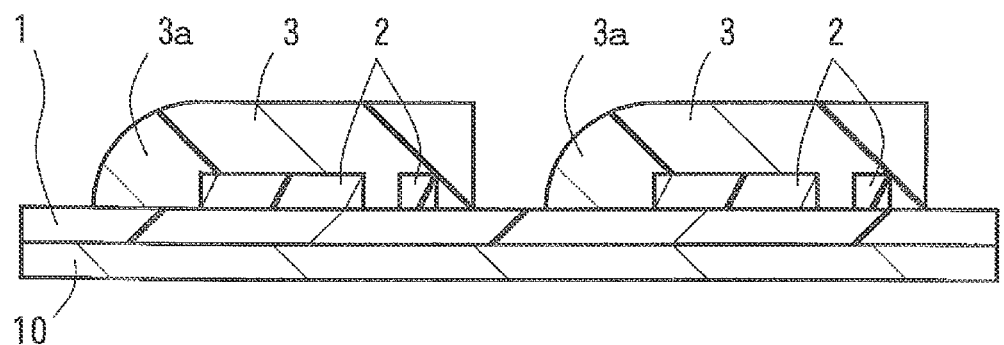
FIG. 3 is a sectional view schematically showing an optical waveguide provided by the method shown in FIGS. 2A to 2D.

The over cladding layers 3 together with the base 10, the under cladding layer 1 and the cores 2 are removed from the mold 20. This provides optical waveguides each including the under cladding layer 1, the cores 2 and the over cladding layer 3 and provided on the surface of the base 10, as shown in FIG. 3 (shown in an orientation vertically inverted from that shown in FIG. 2D). In this preferred embodiment, two optical waveguides are produced, and will be individually separated from each other when each is used. Cured bodies of the photosensitive resin 3A lying within the grooves 22 are removed from the grooves 22 when the over cladding layers 3 are removed from the mold 20.

A heating treatment is performed, as required, before or after the removal of the over cladding layer 3 from the mold 20. The base 10 is stripped, as required, from the under cladding layer 1.

The optical waveguides may be used as detection means (or a position sensor) for detecting a finger touch position and the like on a touch panel by forming the optical waveguides into an L-shaped configuration. Specifically, two L-shaped optical waveguides are produced each of which includes a plurality of cores 2 extending from a corner of the L-shaped configuration to inner edges thereof and arranged in a parallel, equally spaced relationship. Then, a light emitting element is provided outside the corner of one of the optical waveguides, and is optically coupled to the one optical waveguide. Further, a light receiving element is provided outside the corner of the other optical waveguide, and is optically coupled to the other optical waveguide. These optical waveguides are placed along the periphery of a rectangular display screen of the touch panel. This enables the optical waveguides to serve as detection means for detecting a finger touch position and the like on the touch panel.

In this preferred embodiment, one end portion of the over cladding layer 3 is configured as the lens portion 3a. However, the one end portion of the over cladding layer 3 may be of a flat configuration similar to that of the other end portion of the over cladding layer 3.

Also in this preferred embodiment, the grooves 22 formed in the mold 20 have a V-shaped cross-sectional configuration. The grooves 22, however, may be of other configurations. Examples of the cross-sectional configuration of the grooves 22 include U-shaped and quadrilateral (rectangular and trapezoidal) configurations.

Further, the mold 20 in this preferred embodiment is produced from the light-transmissive resin 20A as the material for the formation thereof. However, a light-transmissive support plate may be added to the material for the formation of the mold 20. Specifically, in the step of producing the mold 20, the light-transmissive support plate may be brought into contact with the surface of the light-transmissive resin 20A after the mold production container 30 is filled with the liquid light-transmissive resin 20A. The process of bringing the light-transmissive support plate into contact with the surface of the light-transmissive resin 20A may be performed either immediately after the container 30 is filled with the light-transmissive resin 20A or after a certain period of time has elapsed so that the light-transmissive resin 20A is slightly cured. Preferably, this process is performed after approximately two days in which the degree of curing is appropriate for the light-transmissive support plate to contact the surface of the light-transmissive resin 20A. The mold 20 produced in this manner is reinforced with the light-transmissive support plate. This renders the mold 20 excellent in molding properties during the removal of the mold member 40, and also allows the mold 20 to have a reduced wall thickness, thereby rendering the mold 20 excellent in light transmission properties (or exposure properties through the mold 20).

Next, an inventive example of the present invention will be described in conjunction with a comparative example. It should be noted that the present invention is not limited to the inventive example.

EXAMPLES

Material for Formation of Under Cladding Layer

A material for the formation of an under cladding layer was prepared by mixing 100 parts by weight of an epoxy resin having an alicyclic skeleton (EP4080E available from ADEKA Corporation), two parts by weight of a photo-acid generator (CPI-200X available from San-Apro Ltd.), and five parts by weight of an ultraviolet absorber (TINUVIN 479 available from Ciba Japan K.K.) together.

Material for Formation of Cores

A material for the formation of cores was prepared by dissolving 40 parts by weight of an epoxy resin having a fluorene skeleton (OGSOL EG available from Osaka Gas Chemicals Co., Ltd.), 30 parts by weight of an epoxy resin having a fluorene skeleton (EX-1040 available from Nagase ChemteX Corporation), 30 parts by weight of 1,3,3-tris{4-[2-(3-oxetanyl)]butoxyphenyl}butane, and one part by weight of a photo-acid generator (CPI-200K available from San-Apro Ltd.) in ethyl lactate.

Material for Formation of Over Cladding Layer

A material for the formation of an over cladding layer was prepared by mixing 100 parts by weight of an epoxy resin having an alicyclic skeleton (EP4080E available from ADEKA Corporation), and two parts by weight of a photo-acid generator (CPI-200K available from San-Apro Ltd.) together.

Production of Mold for Formation of Over Cladding Layer

A mold member was produced, with the mold member protruding upwardly from an upper surface of the base member, by cutting an aluminum plate by means of a rotating cutting blade. The mold member included a protruding portion identical in shape with the over cladding layer, and a ridge portion formed around the protruding portion.

Then, the structure was placed in the bottom of a mold production container, with the mold member located on an upper side and the base member located on a lower side. It should be noted that, prior to the placement of the structure, a mold release agent was applied to an inner surface of the container and to surfaces of the mold member and the base member.

Next, the container was filled with a light-transmissive resin (polydimethylsiloxane SIM-260 available from Shin-Etsu Chemical Co., Ltd.) so that the light-transmissive resin had a depth of 1 mm as measured from an upper end surface of the mold member to a liquid surface of the light-transmissive resin. The light-transmissive resin was allowed to stand at room temperature (25° C.) for five days. Thereafter, a heating treatment was performed at 150° C. for 30 minutes. Thus, the light-transmissive resin was cured.

Thereafter, the cured light-transmissive resin was taken together with the mold member and the base member out of the container. Then, the structure including the mold member and the base member was removed from the cured light-transmissive resin, and unnecessary portions of the cured light-transmissive resin were cut off. In this manner, a mold was provided which was made of a light-transmissive resin, and which included a cavity for the formation of the over cladding layer, and a groove formed around the cavity. In this mold, the cavity for the formation of the over cladding layer had one end portion configured in the form of a substantially quadrantal curved lens surface as seen in sectional side view (having a radius of curvature of 1.4 mm). The groove had a V-shaped cross-sectional configuration (having an opening width of 2 mm, and a depth of 1 mm). The mold also had a thickness of 1 mm as measured between the bottom surface of the cavity for the formation of the over cladding layer and the lower surface of the mold.

Manufacture of Optical Waveguide

First, the material for the formation of the under cladding layer was applied to a surface of a stainless steel base (having a thickness of 50 μm) with an applicator. Subsequently, the applied material was exposed to ultraviolet light irradiation at a dose of 1500 mJ/cm$^2$. Thereafter, a heating treatment was performed at 80° C. for five minutes. Thus, the under cladding layer having a thickness of 20 μm (with a refractive index of 1.510 at a wavelength of 830 nm) was formed.

Next, the material for the formation of the cores was applied to a surface of the under cladding layer with an applicator. Thereafter, a heating treatment was performed at 100° C. for five minutes. Thus, a photosensitive resin layer was formed. Next, the photosensitive resin layer was exposed to ultraviolet light irradiation at a dose of 2500 mJ/cm$^2$ through a photomask (placed with a gap of 100 μm) having an opening pattern identical in shape with the pattern of the cores. Thereafter, a heating treatment was performed at 100° C. for ten minutes. Next, development was performed using an aqueous solution of γ-butyrolactone to dissolve away unexposed portions of the photosensitive resin layer. Thereafter, a heating treatment was performed at 120° C. for five minutes. Thus, the cores of a rectangular sectional configuration having a width of 20 µm and a height of 50 µm (with a refractive index of 1.592 at a wavelength of 830 nm) were formed into the core pattern.

Then, the mold for the formation of the over cladding layer was placed on a molding stage, with the cavity and the groove positioned upwards, and the cavity was filled with the material for the formation of the over cladding layer.

Then, the cores formed in the core pattern on the surface of the under cladding layer were immersed in the material for the formation of the over cladding layer. In this state, the cores were positioned relative to the cavity of the mold, and the under cladding layer was pressed against the mold (with a pressing load of 196 N).

Next, the material for the formation of the over cladding layer was exposed to ultraviolet light irradiation at a dose of 5000 mJ/cm$^2$ through the mold. This provided the over cladding layer (with a refractive index of 1.510 at a wavelength of 830 nm) including one end portion configured in the form of a lens portion (a substantially quadrantal convex lens portion as seen in sectional side view (having a radius of curvature of 1.4 mm)), and having a thickness of 950 µm as measured from a top surface of the cores.

Then, the over cladding layer together with the stainless steel base, the under cladding layer and the cores was removed from the mold. This provided an optical waveguide including the under cladding layer, the cores and the over cladding layer and provided on the surface of the stainless steel base. The over cladding layer of this optical waveguide had neither fins nor burrs.

COMPARATIVE EXAMPLE

An optical waveguide was produced in a manner similar to that in the inventive example except that a mold used for the formation of the over cladding layer had no groove around the cavity. The production of this mold was different from the production of the mold in the inventive example in that a mold member including no ridge portion formed around a protruding portion identical in shape with the over cladding layer was used. The mold was produced in a manner similar to that in the inventive example except for the use of the mold member. Then, using the mold, an optical waveguide was provided in a manner similar to that in the inventive example. The over cladding layer of this optical waveguide had fins or burrs, which were in turn cut off.

Measurement of Intensity of Received Light

Two optical waveguides were produced in each of the inventive example and the comparative example. A light emitting element (a VCSEL available from Optowell Co., Ltd.) was optically coupled to a second end (an end where the lens portion was not formed) of one of the optical waveguides, and a light receiving element (a CMOS linear sensor array available from TAOS Inc.) was optically coupled to a second end of the other optical waveguide. These two optical waveguides were placed on opposite sides of a coordinate input area (having a diagonal dimension of 76.2 mm), with their lens portions opposed to each other. In this state, light having an intensity of 5.0 mW was emitted from the light emitting element, and the intensity of light received by the light receiving element was measured.

As a result of the measurement, the received light intensity had a maximum value of 3 V and a minimum value of 2 V, with a difference of 1 V therebetween, when the optical waveguides of the inventive example were used. On the other hand, the received light intensity had a maximum value of 3.5 V and a minimum value of 1.5 V, with a difference of 2 V therebetween, when the optical waveguides of the comparative example were used.

The aforementioned result shows that the optical waveguides of the inventive example, which are smaller in the difference between the maximum and minimum values of the received light intensity, are more excellent in the uniformity of light propagation characteristics than the optical waveguides of the comparative example.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

INDUSTRIAL APPLICABILITY

The method of manufacturing an optical waveguide according to the present invention is applicable to the manufacture of an optical waveguide which is used for optical communications, optical information processing, detection means (or a position sensor) for detecting a finger touch position and the like on a touch panel, and the like.

What is claimed is:

1. A method of manufacturing an optical waveguide, comprising:
    forming a core having a pattern on a surface of an under cladding layer; and
    forming an over cladding layer so as to cover the core by using a mold including a cavity having a mold surface complementary in shape to the over cladding layer,
    wherein the forming of the over cladding layer includes:
        placing the mold with the cavity of the mold positioned upwards,
        filling the cavity of the mold with a photosensitive resin for the formation of the over cladding layer,
        after the filling, immersing the core in the photosensitive resin, and
        exposing part of the photosensitive resin lying in the cavity to light through the mold, while the core is immersed in the photosensitive resin and part of the photosensitive resin spilling out of the cavity is collected in a groove formed in the mold, to cure the part of the photosensitive resin lying in the cavity, thereby forming the over cladding layer,
    wherein the mold is made of a light-transmissive resin,
    wherein the mold is produced by placing a mold member in a mold production container, the mold member including a protruding portion identical in shape to the over cladding layer and a ridge portion provided around the protruding portion, filling the container with a light-transmissive resin, curing the light-transmissive resin, then taking the cured light-transmissive resin out of the container, and removing the mold member from the cured light-transmissive resin, whereby a hollow resulting from the removal of the protruding portion serves as the cavity for the formation of the over cladding layer, and a hollow resulting from the removal of the ridge portion serves as the groove configured to collect the part of the photosensitive resin spilling out of the cavity.

2. The method according to claim 1, wherein a mold surface part of the cavity of the mold corresponding to a portion of the over cladding layer covering a distal end of the core is configured in the form of a lens-shaped curved surface.

3. The method according to claim 2, wherein the light-transmissive resin serving as a material for the formation of the mold contains a silicone resin.

4. The method according to claim 1, wherein the light-transmissive resin serving as a material for the formation of the mold contains a silicone resin.

* * * * *